United States Patent
Imai et al.

(10) Patent No.: US 8,576,186 B2
(45) Date of Patent: *Nov. 5, 2013

(54) HOLDING STRUCTURE FOR A TOUCH PANEL

(75) Inventors: Kazuo Imai, Toyama (JP); Takayuki Mizuki, Toyama (JP); Shinya Iwawaki, Toyama (JP)

(73) Assignee: SMK Corporation, Tokyo (JP)

( * ) Notice: Subject to any disclaimer, the term of this patent is extended or adjusted under 35 U.S.C. 154(b) by 622 days.

This patent is subject to a terminal disclaimer.

(21) Appl. No.: 12/899,479

(22) Filed: Oct. 6, 2010

(65) Prior Publication Data

US 2011/0102343 A1 May 5, 2011

(30) Foreign Application Priority Data

Nov. 2, 2009 (JP) ................................. 2009-252059

(51) Int. Cl.
*G06F 3/041* (2006.01)

(52) U.S. Cl.
USPC ........................................................ 345/173

(58) Field of Classification Search
USPC .................................................. 345/173–178
See application file for complete search history.

(56) References Cited

U.S. PATENT DOCUMENTS

| | | | |
|---|---|---|---|
| 6,532,152 B1 * | 3/2003 | White et al. ................... | 361/692 |
| 2006/0192657 A1 | 8/2006 | Nishimura et al. | |
| 2008/0246741 A1 * | 10/2008 | Hinata .......................... | 345/173 |
| 2009/0002931 A1 | 1/2009 | Iijma et al. | |

FOREIGN PATENT DOCUMENTS

| | | |
|---|---|---|
| EP | 2017689 A2 | 1/2009 |
| JP | 07-105781 A | 4/1995 |
| JP | 09-115378 A | 5/1997 |
| JP | 2000-276254 A | 10/2000 |
| JP | 2002-229672 A | 8/2002 |
| JP | 2006-227712 A | 8/2006 |

OTHER PUBLICATIONS

Applicants bring the attention of the Examiner to the following pending U.S. Appl. Nos. 12/898,693, filed Oct. 5, 2010 and 12/898,700, filed Oct. 5, 2010.
European Search Report dated Dec. 30, 2010, in a counterpart European patent application No. 10176106.2 for Examiner consideration, citing U.S. Patent Application Publication No. 1 and Foreign Patent document No. 1 listed above and JP 2006 227712 and JP 9 115378 which has been submitted in a previous IDS.

* cited by examiner

*Primary Examiner* — Dwayne Bost
*Assistant Examiner* — Scott Trandai

(57) ABSTRACT

A holding structure for a touch panel has a display panel for configuring a display screen and a touch panel for allowing input operation. The structure has an elastic supporting frame for holding the display panel at an entire peripheral edge and supporting the touch panel in parallel with the display panel. The structure has piezoelectric devices for applying vibration to the touch panel in accordance with the operation of the touch panel. The structure has a casing for holding the display panel and the touch panel by way of the elastic supporting frame and the casing has an opening through which the touch panel is exposed. The elastic supporting frame holds the touch panel at an entire peripheral edge of the touch panel and includes a plurality of touch panel supporting portions for supporting the touch panel at a side edge of a rear surface of the touch panel.

5 Claims, 3 Drawing Sheets

HOLDING STRUCTURE FOR A TOUCH PANEL

CROSS REFERENCE TO RELATED APPLICATION

The contents of the following patent application is incorporated herein by reference, NO. 2009-252059 filed on Nov. 2, 2009.

BACKGROUND

1. Technical Field

This invention relates to a holding structure for a touch panel, which is provided at a display or an operation unit of a variety of electronic devices and is used as an input device.

2. Description of the Related Art

Conventionally, electronic devices having a touch panel function as input means at the display surface have been widely used. One of the structures of the touch panels is a touch panel of a resistance-sensitive type. In the touch panel, usually ITO (indium oxide) film is formed in a predetermined pattern on the surface of the touch panel glass. Electrodes are connected to the end portion of the ITO film and the peripheral edge portions are coated by overcoating. And dot spacers are provided between the upper and lower panels both on which ITO films are deposited. When an operator presses the panel, the ITO films on the upper and lower panels get in contact with each other. The pressed position on the panel is detected in accordance with the resistance value at that time.

In the touch panel device, an operator carries out an input operation by directly touching such a display surface as a liquid crystal display panel. Even though the ITO films on the upper and the lower panels get in contact with each other when the operator presses the surface of the touch panel, the operator can neither feel nor be sure whether the contact is closed or not. And so, there is a touch panel equipped with so-called force feedback function which vibrates the touch panel by detecting the press operation and gives an operator an operation feeling.

As it is shown in Japanese Patent Application Publication No. 2006-227712 or in FIG. 4, the touch panel device equipped with the force feedback function is applied, for example, to handheld information equipment or the like. The device is composed of the liquid crystal panel 2 and the touch panel 4 being accommodated in a casing 6 made of resin or the like. The touch panel 4 is equipped with piezoelectric devices 3 for the force feedback function at the side edge portion. And elastic supporters 5 made of rubber or the like are disposed between the liquid crystal panel 2 and the touch panel 4 at four corners in the casing 6. The elastic supporters absorb the vibration of the touch panel 4 due to the piezoelectric devices 3 and hold the touch panel 4.

In the case of the touch panel device with the force feedback function and taking the structure disclosed in Japanese Patent Application Publication No. 2006-227712, an interspace is formed between the liquid crystal panel 2 and the touch panel 4 and the peripheral edges are open. Because of the openness, dusts are liable to come into the interspace between the liquid crystal panel 2 and the touch panel 4. And so, there is a touch panel device equipped with a protective sheet 7 which is applied to the outer front surface of the touch panel 4 covering the touch panel 4 and covering the opening portion 6a of the casing 6 as it is shown in FIG. 4. In the touch panel device taking the structure mentioned above, an operator can get a sure operation feeling because the piezoelectric devices 3 vibrates in accordance with the press operation of the touch panel 4. In addition, because the surface of the touch panel 4 is covered with the protective sheet 7, the dust-proof feature is high at the outer front surface side and the drip-proof feature can be given.

On the other hand, as it is shown in Japanese Patent Application Publication No. 09-115378, a structure which holds the liquid crystal panel fitting to a first elastic member of the frame and holds the touch panel with a second elastic member is proposed as a holding structure for a touch panel with high dust-proof feature and drip-proof feature. Furthermore, the second elastic member is integrally formed with a casing. In this way, the interspace between the liquid crystal panel and the touch panel is surrounded and sealed with the first elastic member, and the dust-proof feature of the interspace between the liquid crystal panel and the touch panel is designed.

In the case of the holding structure for a touch panel shown in FIG. 4 of the related art mentioned above, the dust-proof feature is effective against the dust coming from outside of the device. Since the interspace between the liquid crystal panel 2 and the touch panel 4 is supported only by the supporters 5 at the four corners, however, the interspace between the liquid crystal panel 2 and the touch panel 4 is open except the four corners and the dust is liable to attach to the front surface of the liquid crystal panel 2.

Furthermore, as it is disclosed in Japanese Patent Application Publication No. 09-115378, in the case that the liquid crystal panel takes a structure of being surrounded and held with the elastic member of the frame and being folded with a touch panel, the vibration of the touch panel of which an entire peripheral edge is tightly held with an elastic member of the frame is suppressed and the vibration is not liable to be effectively transmitted to the operator's fingers even though trying to apply the force feedback function to the touch panel.

SUMMARY

The present invention is achieved in consideration of the problems of the related arts mentioned above. The purpose of the present invention is to provide a holding structure for a touch panel with a simple composition, of high dust-proof feature, and with effective transmission characteristics of the vibration to an operator.

According to one aspect related to the innovations herein, one exemplary holding structure for a touch panel may include a display panel which forms a display screen such as liquid crystal display panel, a touch panel disposed at the outer side of the display panel for allowing input operation, an elastic supporting frame for holding the display panel at an entire peripheral edge of the display panel and supporting the touch panel in parallel with the display panel, piezoelectric devices disposed at side edges of the touch panel for applying vibration to the touch panel in accordance with the operation of the touch panel, and a casing for holding the display panel and the touch panel by way of an elastic supporting frame and having an opening through which the touch panel is exposed. The elastic supporting frame includes a plurality of touch panel supporting portions for supporting the side edge portion of the rear surface of the touch panel at a plurality of points as well as holds the touch panel at an entire peripheral edge of the touch panel.

The touch panel supporting portions of the elastic supporting frame may support portions where nodes of the vibration due to the touch panel by the piezoelectric devices exist. Especially, the touch panel supporting portions of the elastic supporting frame may support the four corners of the touch panel.

The elastic supporting frame may includes a panel receiving portion inwardly and entirely extending from an inner peripheral surface of aside wall portion of the frame, and the display panel and the touch panel may be disposed on respective surfaces of the panel receiving portion. The panel receiving portion is perpendicular to the inner peripheral surface and has a constant width. The touch panel supporting portions, the side wall portion, and the panel receiving portion of the elastic supporting frame are allowed to be integrally formed.

The touch panel may be covered with a protective sheet at a front surface side, and the protective sheet is applied to a peripheral edge of the opening of the casing.

In the holding structure for a touch panel related to this invention, an elastic supporting frame holds the display panel and the touch panel surrounding their peripheral edges with a seal-up state, and the dust cannot come into the interspace between the display panel and the touch panel. Furthermore, the elastic supporting frame absorbs the vibration of the touch panel due to the piezoelectric devices in a single member, and has a dust-proof function. Because of the features, the present invention makes it possible to achieve desired effects with a small number of components reducing the man-hour for assembling, and contributes to the cost reduction of the touch panel devices.

In addition, the touch panel supporting portions of the elastic supporting frame can be easily disposed at appropriate positions through molding at the product designing stage and/or manufacturing stage. The vibration damping and the vibration transmission to other members can be suppressed by disposing the touch panel supporting portions to the portions where nodes of the vibration of the touch panel exist.

Moreover, much better dust-proof feature and drip-proof feature can be achieved by applying the protective sheet to the opening of the casing and on the front surface of the touch panel.

DESCRIPTION OF EXEMPLARY EMBODIMENTS

Figure 1:
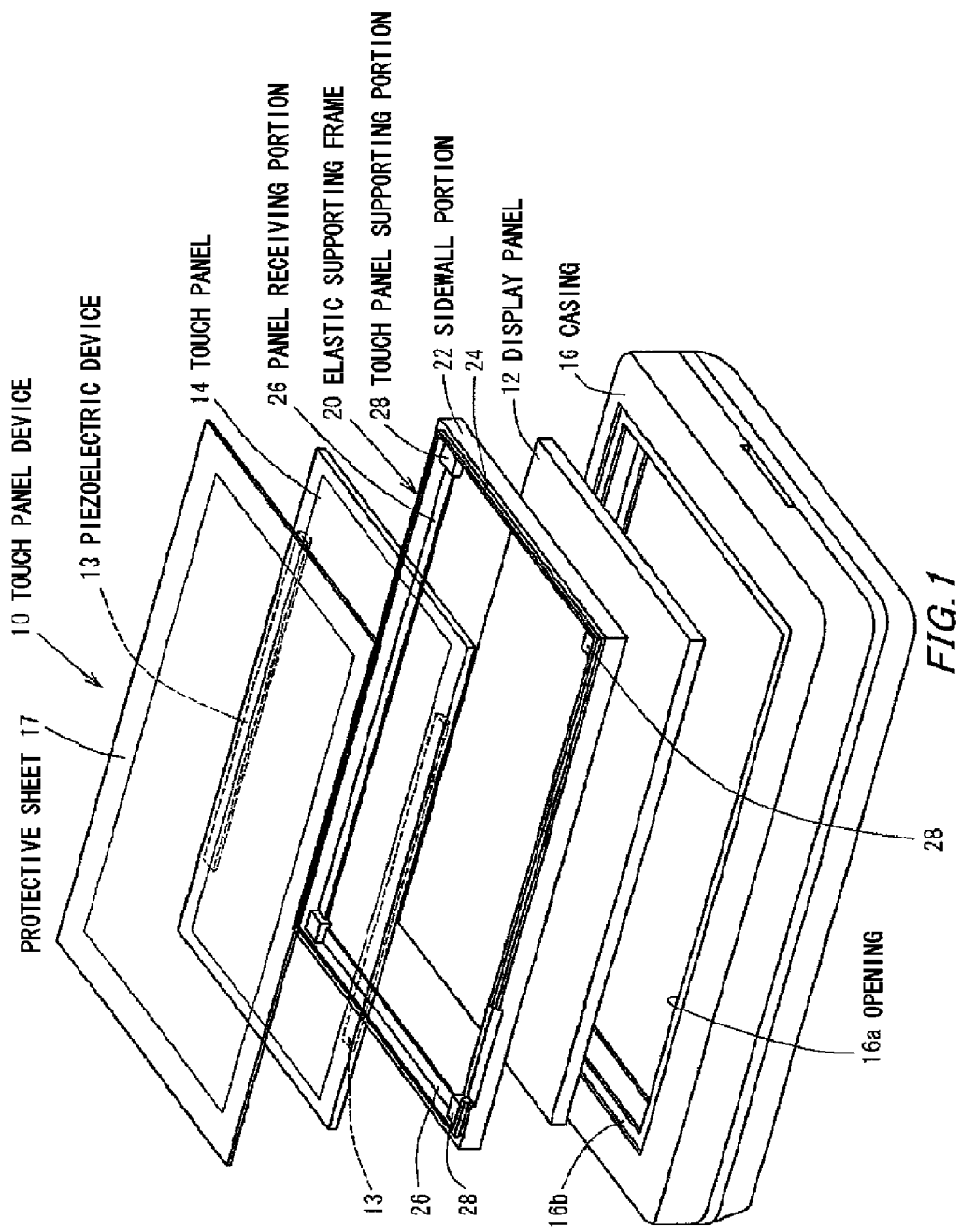
FIG. 1 shows an exploded perspective view of a touch panel device in accordance with an embodiment of the present invention.
Figure 2:
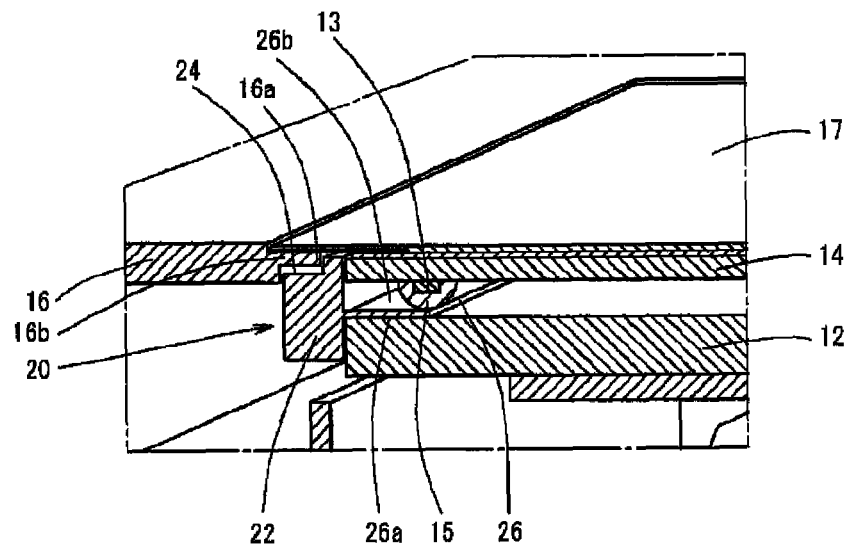
FIG. 2 shows a partial cross-sectional view of the holding structure for a touch panel in accordance with an embodiment of the present invention.
Figure 3:
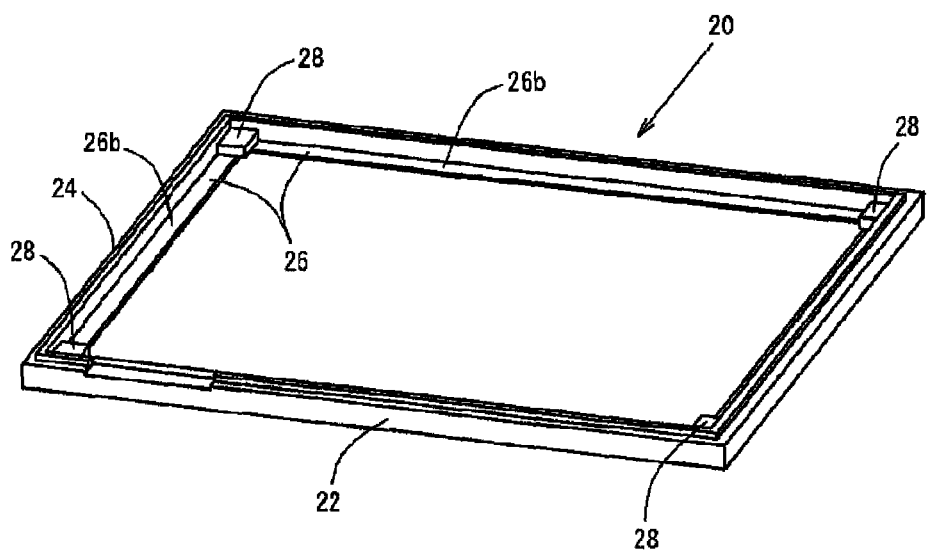
FIG. 3 shows a perspective view of an elastic supporting frame of the holding structure for a touch panel in accordance with an embodiment of the present invention.
Figure 4:
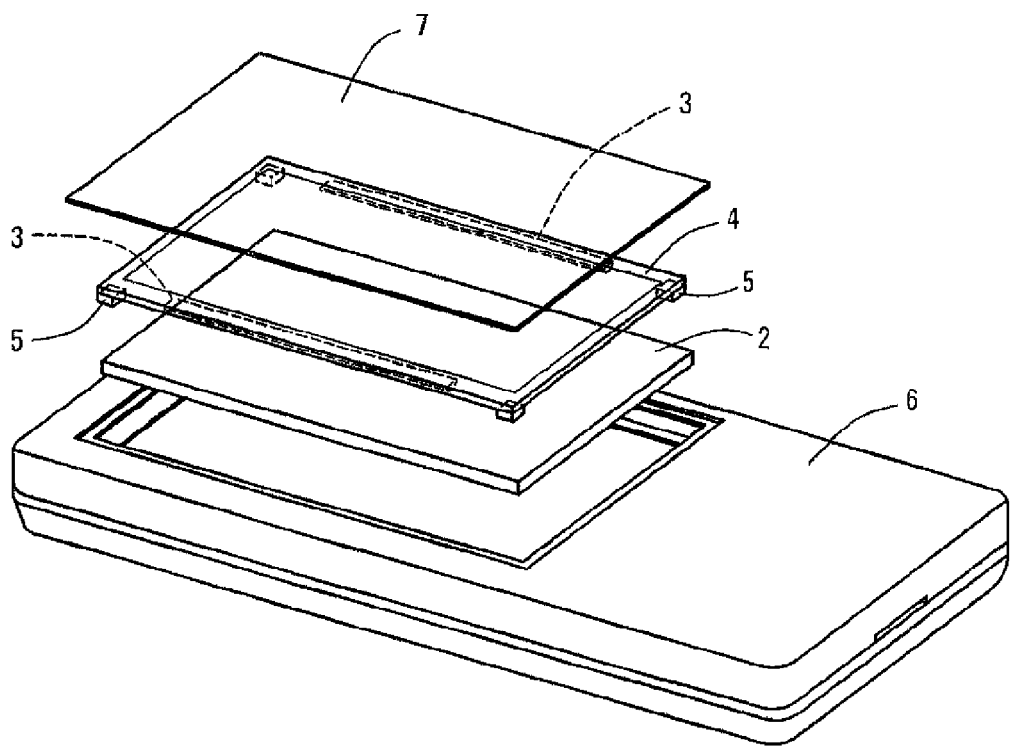
FIG. 4 shows an exploded perspective view of a conventional touch panel device.

Hereinafter, the embodiments related to the present invention are to be explained based upon Figures. FIG. 1, FIG. 2 and FIG. 3 show an embodiment related to the present invention. The touch panel device 10 in the embodiment illustrates an embodiment used in a portable information terminal device. In addition, a touch panel serves as an input device in such various display panels as a computer display, a vehicle navigation device, an automated teller machine, a ticket vending machine. The touch panel device 10 is provided with a display panel 12 used for a liquid crystal display panel or an electroluminescence display panel or the like and a touch panel 14 for allowing input operation, and includes a casing 16 molded by resin or the like accommodating a display panel 12 and a touch panel 14. Furthermore, printed circuit boards, power source units or other electronic components, which are not illustrated, are accommodated in the casing 16.

The structure of the touch panel 14 is in the public domain. ITO film is deposited and formed in a predetermined pattern on the surface, for example, of resin or glass substrate. Electrodes are attached to the end portion of the ITO film. The surfaces of the upper and the lower panels on which ITO films are formed are faced each other with dot spacers in-between. When an operator presses the front surface of the touch panel 14, the ITO films on the both panels get into contact. The pressed position on the touch panel 14 can be detected in accordance with the resistance value at that time.

A predetermined length of piezoelectric devices 13 are attached to a pair of side edge portions being faced each other of the touch panel 14 respectively in order to demonstrate the force feedback function. The length of the piezoelectric devices 13 is not necessarily the whole length of the side of the touch pane 14, however, it is desirable the length is about equal to or longer than half the length of the side. The piezoelectric devices 13 are buried in the elastic adhesive 15 and bonded to the touch panel 14.

The touch panel 14 and the display panel 12 are fitted in the elastic supporting frame 20 of certain strength and an elastic nature such as urethane rubber, silicone rubber or Chloroprene rubber. The elastic supporting frame 20 is, as it is shown in FIG. 2, a rectangular frame shape. The frame has a sidewall portion 22 of a rectangular shape, a cutout portion 24 formed at an entire upper and outer peripheral edge of the sidewall portion 22, and a panel receiving portion 26 inwardly and entirely extending from the center part of an inner peripheral surface of a side wall portion 22. The panel receiving portion 26 is perpendicular to the inner peripheral surface and having a constant width. The panel receiving portion 26 has a display panel receiving surface 26a at the rear surface side, and a touch panel receiving surface 26b facing to the outward. Moreover, the touch panel supporting portions 28, which support the touch panel 14 with the four corners, are integrally formed at the four corners of the sidewall portion 22 and simultaneously the corners of the touch panel receiving surface 26b.

In the assembled state, the elastic supporting frame 20 is, as it is shown in FIG. 2, accommodated inside of the opening 16a of the casing 16, and disposed by the cutout portion 24 of the elastic supporting frame 20 being engaged with the holding edge portion 16b of the opening 16a. The display panel 12 is fitted to the inside of the frame of the elastic supporting frame 20 from the rear surface side, and disposed by the entire peripheral edge of the display panel 12 coming into contact with the display panel receiving surface 26a of the panel receiving portion 26. The peripheral edge of the display panel 12 and the display panel receiving surface 26a are to be bonded with adhesives. It is not necessary for the portions mentioned above to be bonded because the sidewall portion 22 encloses the display panel 12. The touch panel 14 is fitted to the touch panel receiving surface 26b of the elastic supporting frame 20, and elastically supported by the touch panel supporting portions 28 at the four corners. At the time, the piezoelectric devices 13 and the elastic adhesives 15 at the side edge portions of the touch panel 14 are to be accommodated in the step of the touch panel supporting portion 28.

A transparent protective sheet 17 is provided to the outer surface of the touch panel 14 being applied covering the opening 16a of the casing 16 as well as covering the touch panel 14. The protective sheet 17 is larger than the opening 16a, closes the opening 16a, and prevents dust or moisture from coming through the opening 16a of the casing 16.

Each of the piezoelectric devices 13 is connected to a piezoelectric device driving circuit to gives rise to the vibration to the piezoelectric devices 13 and to give a force feedback function which gives an operator an operation feeling. The piezoelectric device driving circuit is not illustrated here. In addition, cables are connected to the electrodes at the side edge portion of the touch panel 14, so that the input information can be transmitted to the control unit in the casing 16. The cables are not illustrated here.

Hereinafter, the function and the effect of the holding structure for a touch panel of the touch panel device 10 in this embodiment are explained. The touch panel supporting portions 28 of the elastic supporting frame 20 are disposed at portions where nodes of the vibration of the touch panel 14 due to the piezoelectric devices 13 exist. In the present embodiment, the nodes of the vibration of the touchpanel 14 are so arranged that they are disposed at the four corners, and the entire peripheral edges both of the display panel 12 and the touch panel 14 are surrounded in close contact with the side wall portion 22 of the elastic supporting frame 20. The interspace between the display panel 12 and the touch panel 14 comes to be sealed up, and no dust will come into the interspace. Moreover, since a protective sheet 17 is applied to the front surface of the touch panel 14 in such a manner as to cover the opening 16a of the casing 16, and further high dust-proof feature and drip-proof feature can be achieved by covering completely the opening 16a, where the touch panel 14 is disposed, of the casing 16.

The positions of the touch panel supporting portions 28 of the elastic supporting frame 20 can be set appropriately in accordance with the form of the molding die during molding, and the touch panel supporting portions 28 can be formed at any positions of the elastic supporting frame 20 by using the molding die with an insert block structure possible to shift the positions for forming the touch panel supporting portions 28.

The holding structure for a touch panel in the present invention is not limited to the embodiment mentioned above. The plurality of the touch panel supporting portions are allowed to be disposed at one side of the elastic supporting frame and allowed to be appropriately disposed in accordance with the size or structure of the touch panel. The shape of the supporting portions is not limited to a rectangular shape, and they are allowed to take such a strange shape as a hook shape as long as the supporting mechanism is satisfied with. The type of the touch panel is not limited to the resistance-sensitive type, but allowed to be combined with other various types. The piezoelectric devices for allowing the force feedback are allowed to be disposed at least one side, or at two sides or more.

What is claimed is:

1. A holding structure for a touch panel, comprising:
   a display panel for forming a display screen;
   a touch panel disposed outside the display panel, for allowing an input operation;
   an elastic supporting frame for holding the display panel at an entire peripheral edge thereof and supporting the touch panel in parallel with the display panel;
   a piezoelectric device disposed at a side edge of the touch panel, for applying vibration to the touch panel in accordance with the operation of the touch panel; and
   a casing for holding the display panel and the touch panel via the elastic supporting frame, the casing having an opening through which the touch panel is exposed, wherein
   the elastic supporting frame holds the touch panel at an entire peripheral edge of the touch panel and includes a plurality of touch panel supporting portions for supporting the touch panel at a side edge portion of a rear surface of the touch panel, and
   the touch panel supporting portions of the elastic supporting frame support portions where nodes of the vibration of the touch panel by the piezoelectric device exist.

2. The holding structure for a touch panel according to claim 1, wherein the touch panel supporting portions of the elastic supporting frame supports four corners of the touch panel.

3. The holding structure for a touch panel according to claim 1, wherein the elastic supporting frame includes a panel receiving portion inwardly and entirely extending from an inner peripheral surface of a side wall portion of the frame, the panel receiving portion being perpendicular to the inner peripheral surface and having a constant width, and the display panel and the touch panel are disposed on respective surfaces of the panel receiving portion.

4. The holding structure for a touch panel according to claim 3, wherein the touch panel supporting portions, the side wall portion, and the panel receiving portion of the elastic supporting frame are integrally formed.

5. The holding structure for a touch panel according to claim 1, wherein the touch panel is covered with a protective sheet on a front surface side of the touch panel, the protective sheet being applied to a peripheral edge of the opening of the casing.

* * * * *